United States Patent [19]
de Briel et al.

[11] Patent Number: 6,079,538
[45] Date of Patent: Jun. 27, 2000

[54] CLUTCH MECHANISM FOR FRICTION CLUTCH WITH LOW DECLUTCHING FORCE

[75] Inventors: Jacques Thirion de Briel, Colombes; Michel Graton, Paris; André Dalbiez, Argenteuil, all of France

[73] Assignee: Valeo, Paris, France

[21] Appl. No.: 09/194,885

[22] PCT Filed: Apr. 7, 1998

[86] PCT No.: PCT/FR98/00698

§ 371 Date: Dec. 4, 1998

§ 102(e) Date: Dec. 4, 1998

[87] PCT Pub. No.: WO98/45611

PCT Pub. Date: Oct. 15, 1998

[30] Foreign Application Priority Data

Apr. 7, 1997 [FR] France ................................ 97 04213

[51] Int. Cl.[7] .............................. F16D 13/50; F16D 13/44
[52] U.S. Cl. .................................... 192/70.27; 192/89.23; 192/109 A
[58] Field of Search .............................. 192/70.27, 70.25, 192/111 A, 89.23, 109 A

[56] References Cited

U.S. PATENT DOCUMENTS

| | | | |
|---|---|---|---|
| 4,949,829 | 8/1990 | Tojima et al. ........................ | 192/89 B |
| 5,551,547 | 9/1996 | Mizukami et al. ................... | 192/89.23 |
| 5,730,267 | 3/1998 | Lopez .................................... | 192/70.27 |
| 5,816,379 | 10/1998 | De Briel et al. ..................... | 192/70.25 |
| 5,855,267 | 1/1999 | Giroire et al. ....................... | 192/70.27 |
| 5,967,283 | 10/1999 | Kemper ................................ | 192/89.23 |
| 6,016,897 | 1/2000 | Bacher ................................ | 192/70.27 |

FOREIGN PATENT DOCUMENTS

| | | |
|---|---|---|
| 0 718 517 | 6/1996 | European Pat. Off. . |
| 2 739 159 | 3/1997 | France . |
| WO 98/10201 | 3/1998 | France . |
| 43 11 286 | 10/1993 | Germany . |
| 43 26 501 | 2/1994 | Germany . |
| 943 039 | 10/1963 | United Kingdom . |

*Primary Examiner*—Charles A Marmor
*Assistant Examiner*—Tisha D. Waddell
*Attorney, Agent, or Firm*—Liniak, Berenato, Longacre & White

[57] ABSTRACT

A clutch mechanism, in particular for motor vehicles, comprising a cover (8) with a base (80), a clutch thrust plate (3) with front friction surface (30) co-operating with a clutch friction (2), and, set between the clutch thrust plate (3) rear surface (36) and the cover (8) base (80), resilient clutch means with axial action (4, 6) axially stressing the clutch thrust plate (3) in a direction opposite to the cover (8) base (80) and a declutching device (7) to counter at will the action of said resilient clutch means (4, 6): the resilient clutch means (4, 6) comprise two Belleville washers (4, 6) series-mounted between the clutch thrust plate (3) and the cover (8), and one (4) of the Belleville washers (4, 6) is in contact at its outer periphery with the clutch thrust plate (3), while the other (6) rests at its outer periphery on the cover (8), said washers (4, 6) sloping inversely, means for transmitting the force (5) carried by the declutching device (7) being incorporated between the inner peripheral zones of the Belleville washers.

14 Claims, 1 Drawing Sheet

CLUTCH MECHANISM FOR FRICTION CLUTCH WITH LOW DECLUTCHING FORCE

BACKGROUND OF THE INVENTION

1. Field of the Invention

The present invention concerns friction clutches with low disengagement force, notably for motor vehicles, and relates more particularly to the engagement mechanism in such a clutch.

2. Description of Related Art

As is known, in a conventional clutch interposed between a driving shaft and a driven shaft, a diaphragm bears on the base of a cover, fixed to a flywheel for driving in rotation, in order to move a thrust plate in the direction of the flywheel, forming a reaction plate, in order to clamp the friction linings of a clutch friction device between the thrust and reaction plates.

The driving flywheel is fixed with respect to rotation to a first shaft, such as a driving shaft, whilst the clutch friction device has at its internal periphery a hub for fixing it with respect to rotation to a second shaft, such as a driven shaft.

The clutch is therefore normally engaged, with torque transmission between the driving and driven shafts.

In order to disengage, or declutch, the clutch, it is necessary, using a clutch release bearing, to act axially by pushing, in the case of a clutch of the pushed type, on the internal end of the diaphragm fingers in order to pivot the diaphragm and cancel out the force exerted by this diaphragm on the axially movable thrust plate in order to release the friction linings. The torque is then no longer transmitted from the driving shaft to the driven shaft, since the friction linings are no longer clamped between the thrust and reaction plates fixed with respect to rotation to the hollow-shaped cover.

Normally, the cover, thrust plate and diaphragm form a unitary assembly referred to as the clutch mechanism, which is attached by its cover to the flywheel, elastic tongues rotatably connecting, with axial mobility, the thrust plate to the cover.

The diaphragm, as is known, has a central hole and an external peripheral part in the form of a Belleville washer extended inwards by a central part divided into radial fingers by slots. This diaphragm, through its Belleville washer part, bears on the cover and on the thrust plate. Thus the disengagement device of the clutch, which makes it possible to counteract at will the action of the elastic engagement means, consists of the fingers of the diaphragm on the internal end of which the clutch release bearing acts, whilst the Belleville washer of the diaphragm constitutes elastic axially acting engagement means for clamping the friction linings between the thrust and reaction plates and therefore to axially force the thrust plate in the opposite direction to the base of the cover.

In the free state, this diaphragm has a frustoconical shape. Once mounted in the clutch, its Belleville washer is mounted under prestress and is more or less flattened. During the operation of declutching, or disengaging, the clutch, the conicity of its Belleville washer is modified.

As is known, the characteristic curve of this diaphragm, which represents the force exerted according to the disengagement travel, for example returned to the level of the inner end of the diaphragm fingers, is determined by the dimensions of its Belleville washer, notably by the ratio between the height of the truncated cone of the Belleville washer in the free state and the thickness of the diaphragm.

This characteristic curve passes through a maximum.

Thus the force to be exerted on the internal end of the diaphragm fingers, during the disengagement operation, increases up to a maximum, decreases gradually to a minimum, and then increases once again.

The difference between the maximum and the minimum can be great. For more information on this characteristic curve, reference should be made for example to the document FR-A-1 392 569 or to the document WO-97/19 275.

In the document FR-A-1 392 569, provision is made for an elastic progressive-action device for avoiding passing through the aforementioned maximum during the disengagement travel. This device is mounted in series with the Belleville washer of the diaphragm and has an elastic force which is appreciably less than that of the Belleville washer. This device has a limited travel between a prestressing position where its force is at a maximum and a stressing position where its force is at a minimum.

With this arrangement an overall increasing disengagement force is obtained at the clutch release bearing.

It is not possible to obtain, during the disengagement travel, an assistance which is as great as desired, the progressive-action device reducing the load exerted by the diaphragm on the thrust plate during this engagement.

The load curves of the progressive-action device and of the diaphragm have shapes which do not make it possible to combine them in order to obtain strong assistance with disengagement, particularly if it is wished to comply with the disengagement travels and forces compatible with the actual disengagement commands. Moreover, the shape of the curve of the progressive-action device changes very rapidly with the life of the clutch, and the higher the assistance level required, the more this cancels out the disengagement assistance. In order to prevent aging of the curve of the assistance device, it is preferably to place this at a point where its stiffness curve will remain stable over time and, in particular, at a place positioned outside the progressive-action area of the friction device where the lining contact and the phenomenon of incrustation change and cause the progressive-action curve to change.

Thought can then be given to causing an assistance spring to act in parallel with the diaphragm. In this case, the assistance spring, for example in the form of a Belleville washer, can bear on the cover and on the inner end of the diaphragm fingers.

In the clutch engaged position, it can then exert a minimum force, and then, its conicity varying, exert an assistance force during the disengagement operation. It is therefore necessary for this assistance force to be at a minimum in the clutch-engaged position throughout the life of the clutch.

The idea for this type of design is to have recourse to an adjustment device, referred to as a wear take-up device, which always holds the diaphragm roughly in the same position, whatever the wear on the friction linings of the clutch and/or the friction faces of the thrust and reaction plates, so that the assistance spring exerts, in all circumstances during the life of the clutch, a very low force when the clutch is in the engaged position.

In the certificate of addition 86 983 to French patent 1 392 569, it has already been proposed to interpose, between the elastic washer of the diaphragm and the thrust plate, an auxiliary elastic washer, the two elastic washers being placed in series; the auxiliary elastic washer affords a certain degree of progressive action of the engagement of the clutch and procures a certain amount of assistance force during its disengagement.

SUMMARY OF THE INVENTION

The object of the present invention is to create, simply and economically, a friction clutch with a low disengagement force having recourse also to springs acting in series without appreciably decreasing, throughout the life of the clutch, the clamping force of the friction linings in the clutch-engaged state.

According to the invention, an engagement mechanism for a friction clutch, notably for motor vehicles, having a hollow-shaped cover with a transversally oriented base and fixing means for fixing the engagement mechanism to a flywheel driving in rotation, a thrust plate having at the front a friction face for cooperation with a clutch friction device, elastic tongues for connecting in rotation, with axial mobility, the thrust plate with the cover. Interposed between the rear face of the thrust plate and the base of the cover, on the one hand is elastically acting engagement means axially forcing the thrust plate in the opposite direction to the base of the cover and on the other hand a disengagement device for counteracting at will the action of the said elastic engagement means. The elastic engagement means have two Belleville washers mounted in series between the rear face of the thrust plate and the cover, and by the fact that one of the Belleville washers, referred to as the first Belleville washer, is in contact through its external periphery with the thrust plate, whilst the other one of the Belleville washers, referred to as the second Belleville washer, bears through its external periphery on the cover, the washers being inclined in opposite directions, force transmission means being interposed between the internal peripheries of the first and second Belleville washers, the force transmission means being carried by the disengagement device.

Advantageously, the force transmission means consist of a spring ring, divided or not.

Preferably, the second Belleville washer is chosen so as to exert a preponderant action with respect to the first Belleville washer.

Advantageously, in absolute value, the stiffness of the second Belleville washer is greater than the stiffness of the first Belleville washer. This takes account of the presence of elastic progressive-action means between the two friction linings and the clutch friction device.

Advantageously, the second Belleville washer develops a maximum load greater in absolute value than that developed by the first Belleville washer.

Preferably, the Belleville washers are held in contact with the force transmission means by an elastic clamp, possibly divided, coming into engagement with the external faces of the Belleville washers.

Advantageously, according to one embodiment, the disengagement device comprises a transverse plate carrying at its external periphery the force transmission means and connected through its internal periphery to a sleeve mounted so as to slide axially.

According to a variant, the disengagement device comprises an annular disc carrying in its radially median part the force transmission means and having, at its external periphery, lugs passing through openings provided in a cylindrical peripheral skirt on the cover, the lugs of the annular disc being adapted to bear on an edge of these openings when the part of the annular disc adjacent to its internal periphery is moved axially.

According to another variant, the disengagement device comprises a disc having an annular part extended towards the axis by a central part divided into radial fingers by slots. The force transmission means is placed at the external periphery of the annular part itself mounted for articulation at the internal periphery of the base of the cover.

Advantageously, the mechanism is equipped with a wear take-up device for at least one of the linings of the clutch friction device.

Preferably, the wear take-up device is actuated by the first Belleville washer.

Advantageously, the thrust plate has at its rear a protrusion for abutment of the external periphery of the first Belleville washer and a stop situated radially below the protrusion in order to limit the inclination of the first Belleville washer.

Advantageously, the first Belleville washer is subjected to the action of at least one elastic hook fixed to the thrust plate, the external periphery of the first Belleville washer being gripped between the protrusion on the thrust plate and the hook.

Preferably, the base of the cover carries a stop situated radially below the abutment on the cover of the second Belleville washer in order to limit the inclination of the washer.

BRIEF DESCRIPTION OF THE DRAWINGS

The description which follows illustrates the invention with regard to the accompanying drawings in which.

DETAILED DESCRIPTION OF PREFERRED EMBODIMENT

Figure 1:
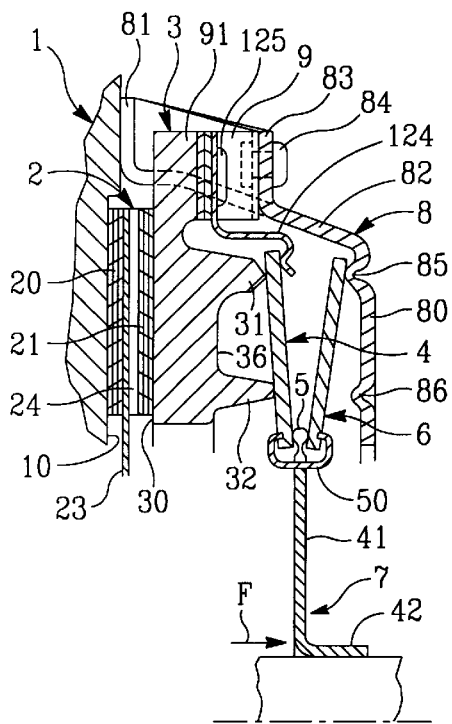
FIG. 1 is a half-view in axial section of a clutch according to the invention in the clutch engaged position.

The clutch depicted in FIG. 1 has a set of annular-shaped parts, namely, in succession axially, a flywheel 1 driving in rotation for fixing the clutch to a first shaft, such as a driving shaft, a clutch friction device 2 having at its external periphery friction linings 20, 21 and at its internal periphery a hub, not shown, for rotatably connecting the clutch with a second shaft such as a driven shaft, a thrust plate 3, a first Belleville washer 4, a bearing spring ring 5, a second Belleville washer 6 inclined in the opposite direction with respect to the first Belleville washer 4, a declutching device 7, a hollow-shaped cover 8 having a roughly transversely oriented base 80 with a central hole and, at its external periphery, fixing means 81 for fixing the cover 8 to the flywheel 1 forming a reaction plate.

The flywheel 1 has at its rear a friction face 10 and is depicted here partially, knowing that, in a known fashion, it has centrally holes for fixing it to the driving shaft by means of screws. Here the flywheel 1 is made in a single piece whilst being of castable material just like the thrust plate 3, which has at its front a friction face 30 opposite the friction face 10 of the flywheel 1.

The flywheel 1 and thrust plate 3 are here made of cast iron.

The clutch friction device 2 also has a support disc 23 for carrying the friction linings 20, 21, possibly divided.

These linings 20, 21 extend on each side of the support disc 23 whilst being fixed to it for example by riveting. Here, the linings 20, 21 are fixed by bonding or brazing to the metallic support disc 23.

In a known fashion, elastic axially acting progressive-action means 24 are interposed between the two linings 20, 21 for progressive clamping thereof between the flywheel 1 and thrust plate 3. These means can have any suitable shape. Here, these means 24 are produced by shaping the support disc 23. This disc, non-limitatively, can have a central part for connecting it, in an elastic fashion or not, to the hub, and a peripheral part divided into radial blades, for example of the tripod type. Each blade then has a central bearing area intended for fixing one of the friction linings 20, 21 and two external peripheral bearing areas intended to cooperate with the other one of the friction linings 20, 21.

The bearing areas are offset axially with respect to the central part of the disc 23, the central bearing area, of large extent, being connected to the said central part by a tangential fold, whilst the peripheral bearing areas are connected to the central bearing area by oblique folds. For more information, reference should be made to the document U.S. Pat. No. 5,452,783, also showing an embodiment with friction linings divided into pads. The friction linings can be fixed by riveting and/or bonding to the central bearing areas.

As mentioned above, the disc 23 can be coupled elastically to the hub. As a variant, the disc 23 is coupled rigidly to the hub, the flywheel I then being divided in order to have two masses coupled elastically to each other by circumferentially or radially acting springs.

As a variant, the flywheel 1 can be in two parts and have a support flange fixed at its internal periphery to the driving shaft and at its external periphery to a reaction plate having the friction face 10. The cover 8 can then be connected to the flywheel 1 in two parts by means of axially oriented lugs issuing from its cylindrical peripheral skirt 82. These lugs, in the form of tenons, are then engaged in mortises formed at the external periphery of the reaction plate or of the support flange. The free portion of the lugs, forming the aforementioned fixing means 81 for the cover 8, can be fixed, by crimping, folding over or welding, to the flange or to the reaction plate, as described for example in French patent application FR-A-2 741 917 filed on Oct. 24, 1995.

Here, the cover 8 has a conventional form and the fixing means 81 consist of a radial edge on the cover 8, directed radially in the opposite direction to the axial symmetry axis of the clutch, the edge 81 being provided with holes, not visible, for mounting members for fixing the edge 81 to the flywheel 1, such as screws or, as a variant, rivets.

With regard to an application for a motor vehicle, the driving shaft is here the driving shaft of the vehicle, to the crankshaft of which the flywheel 1 is fixed, whilst the driven shaft consists of the gearbox input shaft.

Naturally, it is possible to reverse the structures, the first shaft being able to be the driven shaft and the second shaft a driving shaft.

In this figure, the thrust plate 3 is connected with respect to rotation with the cover 8 by elastic tongues 9 enabling the thrust plate 3 to move axially with respect to the cover 8. The thrust plate 3 is therefore fixed with respect to rotation to the cover 8 and flywheel 1, whilst being axially movable with respect to these.

The tongues 9 are here tangentially oriented and force the thrust plate 3 in the direction of the base 80 of the cover. These elastic tongues 9 are therefore axially acting and have a return action. As a variant, the tongues can be radially oriented.

Here, the external cylindrical skirt 82 of the cover 8, connecting the base 80 to the radial fixing edge 81, has holes locally for the passage of lugs 91, which the thrust plate 3 has in radial projection. The tangential tongues 9 are fixed at one of their ends to the lugs 91 and at their other end to a radial area 83 on the cover. These tongues 9 are distributed regularly on the circumference, in a known fashion; their number, like that of the lugs 91, depends on the application, knowing that, for private cars, recourse is generally had to three tongues 9 or groups of tongues.

These tongues 9 are fixed to the areas 83 and to the lugs 91 by means of fixing members 84, usually rivets, or as a variant screws or bolts. Here, the rivet 84 associated with the lug 91 cannot be seen, since the latter is circumferentially broad for fixing a return hook 124 coupling the first Belleville washer 4 to the thrust plate 3; the hooks 124 (one per lug 91) are fixed by means of rivets 125, or as a variant screws or bolts.

More precisely, the first washer 4 bears at its external periphery on an annular protrusion 31, here divided, which the thrust plate 3 has on its rear face 36.

The protrusion 31 has a pointed shape with a rounded apex for local contact with the external periphery of the first washer 4 gripped between the said protrusion 3 and the hooks 124, here metallic and elastic. These hooks 124 have at their end a curved shape for point contact, opposite the protrusion 31, with the said washer 4. This washer 4 is inclined, in the direction of the cover 8, its concavity being directed towards the thrust plate 3.

The second Belleville washer 6 bears at its external periphery on a dished part 85, divided or not, formed in the base 80 of the cover 8 and directed axially towards the thrust plate 3. The second Belleville washer 6 is inclined in the direction of the thrust plate 3, in the opposite direction to the first washer 4, its concavity being directed towards the base 80 of the cover 8.

The two Belleville washers 4 and 6 thus have in section a V shape whilst being in contact at their internal periphery with an annular force-transmission spring ring 5 interposed between them.

Advantageously, the washers 4 and 6 are hollowed locally for receiving the spring ring 5. The external face of these washers 4 and 6 is grooved in order to hold a U-shaped clamp 50 on which the free ends of the legs are axially oriented. The clamp 50 extends through its base radially below the washers 4 and 6.

The clamp 50, here annular in shape, is elastic and elastically clamps the washers 4 and 6 in contact with the spring ring 5 whilst being in contact through its legs with the external face of the washers. This clamp can as a variant be divided into clips. According to the inclination of the washers 4 and 6, the clamp opens or close.

The disengagement device 7 comprises a transverse plate 41 bearing at its external periphery the annular force-transmission spring ring 5; the transverse plate 41 is connected by its internal periphery to a sleeve 42 mounted so as to slide axially.

This disengagement means 7 is designed to counteract and overcome at will the elastic action of the Belleville washers 4 and 6 with a view to releasing at will the friction linings 20, 21 and the clutch friction device 2 from between the thrust plate 3 and reaction plate 1 in order to disengage the clutch.

The Belleville washers 4 and 6 make it possible to clamp the linings 20, 21 between the plates 1 and 3 and constitute the axially acting engagement means forcing the thrust plate in the opposite direction to the base 80 of the cover 8.

The sleeve 42 of the disengagement device 7 can be moved, with a view to the disengagement operation, in one direction or the other, that is to say in the direction of the arrow F, the clutch being of the pulled type, or in the opposite direction to that of the arrow F, the clutch being of the pushed type: this depends on the choice of the relative characteristics of the first 4 and second 6 Belleville washers.

More precisely, under the conditions described below, one of the Belleville washers provides the clamping of the clutch and is designated below as the clamping washer; the other Belleville washer affords assistance for the disengagement and is designated below as the assistance washer.

Figure 4:
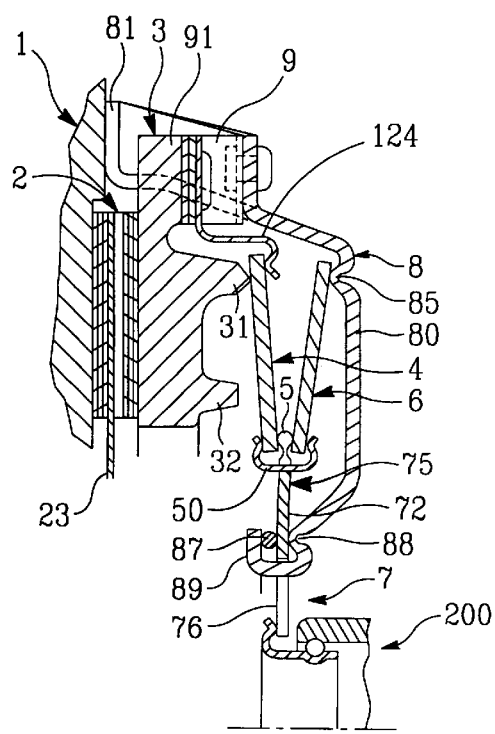
FIG. 4 is a half-view in axial section showing yet another variant clutch according to the invention.

The clamping washer, like the Belleville washer part of a diaphragm, is such that the load which it affords increases with the height of the truncated cone which it represents. The assistance washer is such that the load which it procures, whilst of course being less than that procured by the clamping washer, decreases with the height of its truncated cone. With the two washers working in the area of their characteristic curve with practically linear crushing load, it can be seen that, by choosing washers whose curves are, in these areas, practically parallel, the disengagement force, which at each position of the disengagement device is equal, or proportional, to the difference between the loads of the washers, is low and practically constant. As a variant, if the stiffness of the clamping washer is greater than that of the assistance washer, a clamping force can be obtained which is low but increasing slightly with the disengagement travel. These characteristic curves must of course take account of the existence, when such exists, of the force due to the elastic progressive-action means 24 of the friction device 2, and theoretically of the force due to the elastic tongues 9, but this is negligible, these forces, as is known, acting in the direction of the disengagement and participating in assistance for disengagement. For more information, reference should be made to the document WO 97/19275 (FIG. 4). Thus the clamping washer is a negative washer used beyond the maximum of the characteristic curve of a Belleville washer, and the assistance washer is a positive washer used between the origin and the maximum of the curve.

FIG. 1 shows the case of a pulled clutch, that is to say the disengagement is obtained by acting, at the sleeve 42, in the direction of the arrow F; the second Belleville washer 6 is here the assistance washer and the first washer 4 is the clamping washer.

In FIG. 1, the clutch is-shown engaged under the load of the second Belleville washer 6, transmitted to the thrust plate 3, via the force transmission means 5, here in the form of a spring ring, by the first Belleville washer 4 in abutment through its external periphery on the annular protrusion 31 and through its internal periphery on the annular stop 32.

During an action on the sleeve 42 in the direction of the arrow F, the assistance washer 6 is to a certain extent compressed, its load exerted increasing and its internal periphery being brought closer to the base 80 of the cover 8; this compression is assisted by the clamping washer 4, which releases the stored energy, in the engaged position, under the effect of the washer 6, which is preponderant, during the engagement operation. The compression travel of the washer 6 is limited at the level of the disengagement device 7 or, as depicted, by a dished part 86 in the base 80 of the cover 6 with which the washer 6 comes to cooperate at the end of the disengagement operation.

It will easily be understood that, in order to produce a clutch of the pushed type, that is to say in which the disengagement operation is obtained by acting on the sleeve 42 in the reverse direction to that of the arrow F, it suffices to exchange the characteristics of the washers 4 and 6. According to this variant, therefore, the first Belleville washer 4 is the assistance washer and the second Belleville washer 6 is the clamping washer; here, in the engaged position, the washer 4 is at a distance from the annular stop 32 and the washer 6 is in abutment at the same time on the dished parts 85 and 86 of the base 80 of the cover 8; the annular stop 32 here fulfils the role of disengagement travel limitation.

As is known, it is easier to control the load characteristic of a Belleville washer than that of a diaphragm; consequently, here, the characteristics of the engagement means consisting of two Belleville washers 4–6—are easily controlled and it is possible to ensure that the clamping force of the friction device 2 varies little according to the wear on the linings 20, 21 which it carries. In the case of wear on the linings 20, 21, only the conicity of the washer 6 varies in that the height of its truncated cone increases; in making this clamping washer 6 work, in the engaged position, close to its maximum whilst remaining below this maximum for its position corresponding to the maximum of the total wear on the linings, the clamping force fluctuates only a little.

Figure 2:
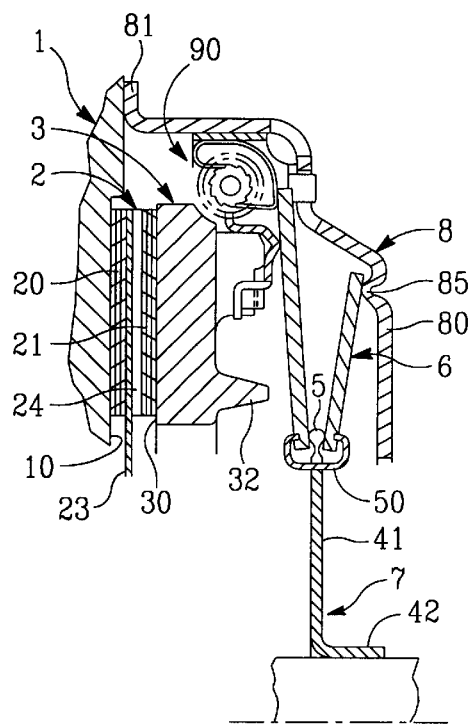
FIG. 2 is a half-view in axial section showing a clutch of the type in FIG. 1 equipped with a wear take-up device.

If better consistency of the clamping force is required, it is possible to equip the engagement mechanism with a wear take-up device such as the device 90 shown in FIG. 2. The device 90 was described in detail in the French patent application filed on Dec. 23, 1996 under the number 96 15 865, to which reference should be made for more information, the corresponding description having to be considered as forming part of the present application. Thus the clutch of FIG. 2 is of the pushed type, the washer 4 being the clamping washer and the washer 6 being the assistance washer. In this figure, it will also be noted that, in the engaged position which is the one shown, the assistance washer 6 is in abutment on the cover 8 only through its external periphery; this is because, here, the assistance washer 6 has been compressed by the clamping washer 4 to value which corresponding to a load stored by this washer equal to the load of the clamping washer 4, the two washers 4 and 6 being in some way in equilibrium; by virtue of the take-up device 90, the two washers 4 and 6 keep the same position, in the engaged position, whatever the wear on the linings 20, 21. Naturally, the arrangements can be reversed, ensuring that it is the washer 6 which acts on the device 90.

Figure 3:
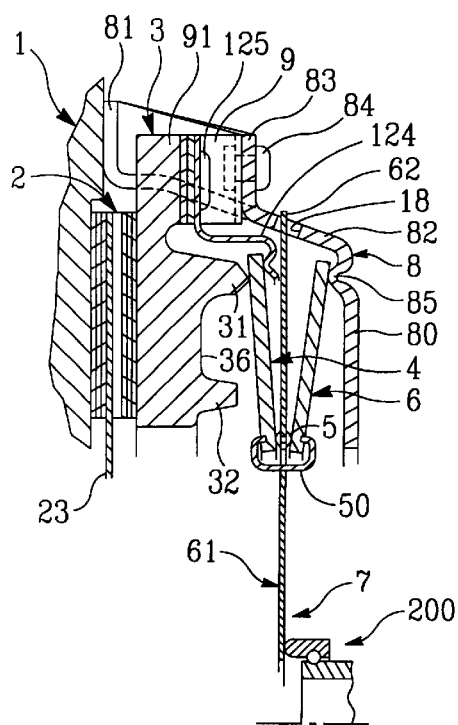
FIG. 3 is a half-view in axial section showing a variant clutch according to the invention.

According to the variant in FIG. 3, the disengagement device 7 comprises an annular disc 61 carrying, in its radially middle part, for example by riveting, the force transmission means 5. The Belleville washers 4 and 6 are placed on each side of the annular disc 61; the latter also has, at its external periphery, lugs 62 passing through openings 18 provided in the cylindrical peripheral skirt 82 of the cover 8. These lugs 62 are adapted to bear on an edge of these openings 18 when the adjacent part of the internal periphery of the annular disc 61 is moved axially by a clutch release bearing 200, from right to left as seen in the figure, with a view to performing the disengagement operation, the clutch depicted here being of the pushed type.

It would of course be possible, as previously, by reversing the role of the washers 4 and 6, to produce as a variant a clutch of the pulled type having a disengagement device in the form of a disc, such as the disc 61.

According to the variant depicted in FIG. 4, the disengagement device 7 comprises a disc 75 having a central part 76 in the form of fingers separated by slots, this central part 76 extending a peripheral annular part 72. These fingers can be ribbed longitudinally in the center. The annular part 72 connects the fingers together and consists of a simple washer optionally provided with blind radial slots opening out towards the outside so that this washer does not exert any load, or only a very small load, axially.

As a variant, low elasticity can be given to the peripheral part 72 in order to improve comfort at the control pedal for the clutch release bearing 200 and exert a return action.

The disc 75 is mounted so as to be articulated at the internal periphery of the base 80 of the cover 8, between two supports 87, 88, one of them 87 in the form of a spring ring, the other 88 in the form of a dish in the base 80 of the cover 8, between which it held by virtue of folded over lugs 89 on the cover; thus, as can be seen, the disc 75 is mounted so as to be articulated like a clutch diaphragm. Here, as the clutch release bearing 200 is depicted, the clutch is of the pulled type but naturally, as explained above, it could easily be converted into a pushed clutch, by exchanging the washers 4 and 6.

In the figures, the force transmission means are in the form of a spring ring but naturally they can have different forms.

The thrust plate 3 has at its front a friction face 30 for cooperation with the clutch friction device and its rear face 36 is shaped so as to offer a support, by virtue of the protrusion 31, for the first Belleville washer 4 and to form a stop 32 limiting the inclination of the said washer 4. This stop 32, obtained by casting, is located radially below the protrusion 31, having a height less than it.

The elastic engagement means, that is to say the Belleville washers 4 and 6, and the disengagement device 7, are interposed between the cover 8 and thrust plate 3 in order to form with them, in combination with the tongues 9 and return hooks 124, a manipulatable and transportable unitary assembly referred to as the engagement mechanism. It is this engagement mechanism which is attached to the flywheel for driving in rotation 1.

It should be noted that here the cover 8 surrounds the thrust plate 3, the Belleville washers 4 and 6 and the disengagement device 7.

What is claimed is:

1. Engagement mechanism for a friction clutch, having a hollow-shaped cover (8) with a transversally oriented base (80) and fixing means (81) for fixing the engagement mechanism to a flywheel (1) driving in rotation, a thrust plate (3) having at a front a friction face (30) for cooperation with a clutch friction device (2), elastic tongues (9) for connecting in rotation, with axial mobility, the thrust plate (3) with the cover (8), and, interposed between a rear face (36) of the thrust plate (3) and the base (80) of the cover (8), on the one hand elastically acting engagement means (4, 6) axially forcing the thrust plate (3) in an opposite direction to the base (80) of the cover (8) and on the other hand a disengagement device (7) for counteracting at will an action of the said elastic engagement means (4, 6), wherein said elastic engagement means (4, 6) have two Belleville washers (4, 6) mounted in series between the rear face (36) of the thrust plate and the cover (8), and wherein one (4) of the Belleville washers (4, 6), referred to as the first Belleville washer, is in contact through its external periphery with the thrust plate (3), whilst the other one (6) of the Belleville washers (4, 6), referred to as the second Belleville washer, bears through its external periphery on the cover (8), said washers being inclined in opposite directions, force trans- mission means (5) being interposed between the internal peripheries of the first (4) and second (6) Belleville washers, the force transmission means (5) being carried by the disengagement device (7).

2. Mechanism according to claim 1, wherein the force transmission means (5) consist of a spring ring.

3. Mechanism according to claim 1, wherein the second Belleville washer (6) is chosen so as to exert a preponderant action with respect to the first Belleville washer (4).

4. Mechanism according to claim 3, wherein the stiffness of the second Belleville washer (6) is greater than the stiffness of the first Belleville washer (4).

5. Mechanism according to claim 4, the second Belleville washer (6) develops a maximum load greater in absolute value than that developed by the first Belleville washer (4).

6. Mechanism according to claim 1, wherein the Belleville washers (4, 6) are maintained in contact with the force transmission means (5) by an elastic clamp (50) coming into engagement with the external faces of the Belleville washers (4, 6).

7. Mechanism according to claim 1, wherein the disengagement device (7) comprises a transverse plate (41) carrying at its external periphery the force transmission means (5) and connected by its internal periphery to a sleeve (42) mounted so as to slide axially.

8. Mechanism according to claim 1, wherein the disengagement device (7) comprises an annular disc (61) carrying in its radially median part the force transmission means (5) and having, at its external periphery, lugs (62) passing through openings (18) provided in a cylindrical peripheral skirt (82) on the cover (8), the lugs (62) of the annular disc (61) being adapted to bear on an edge of these openings (18) when the part of the annular disc (61) adjacent to its internal periphery is moved axially.

9. Mechanism according to claim 1, wherein the disengagement device (7) comprises a disc (75) having an annular part (72) extended towards the axis by a central part (76) divided into radial fingers by slots, the force transmission means (5) being placed at the external periphery of the said annular part (72) itself mounted for articulation at the internal periphery of the base (80) of the cover (8).

10. Mechanism according to claim 1, wherein the mechanism is equipped with a wear take-up device (90) for at least one of the linings of the clutch friction device (2).

11. Mechanism according to claim 10, wherein the wear take-up device (90) is actuated by the first Belleville washer (4).

12. Mechanism according to claim 1, wherein the thrust plate (3) has at its rear a protrusion (31) for abutment of the external periphery of the first Belleville washer (4) and a stop (32) situated radially below said protrusion (31) in order to limit the inclination of said first Belleville washer (4).

13. Mechanism according to claim 12, wherein the first Belleville washer (4) is subjected to the action of at least one elastic hook (124) fixed to the thrust plate (3), the external periphery of said first Belleville washer (4) being gripped between the protrusion (31) on the thrust plate (3) and said hook (124).

14. Mechanism according to claim 1, wherein the base (80) of the cover (8) carries a stop (86) situated radially below an abutment (85) on the cover (8) of the external periphery of the second Belleville washer (6) in order to limit the inclination of said second Belleville washer (6).

* * * * *